Sept. 4, 1956          C. G. PULLIN          2,761,521
HELICOPTER ROTOR CONTROL MECHANISM
Original Filed Aug. 31, 1944          9 Sheets—Sheet 1
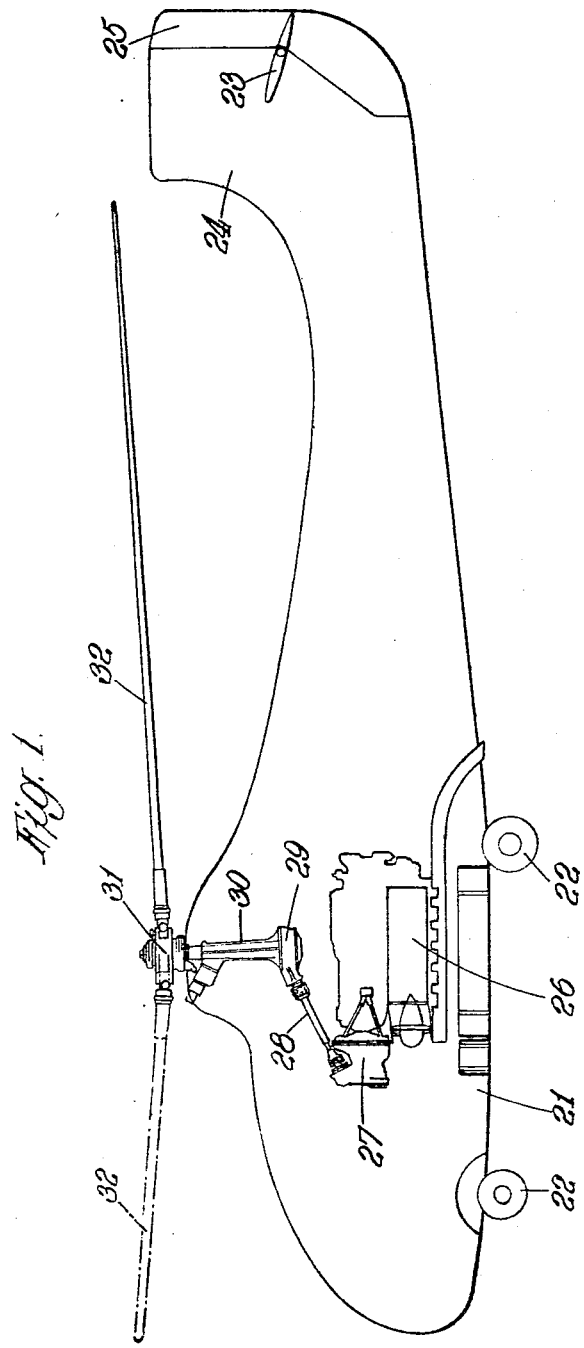
INVENTOR
Cyril George Pullin
BY
ATTORNEYS

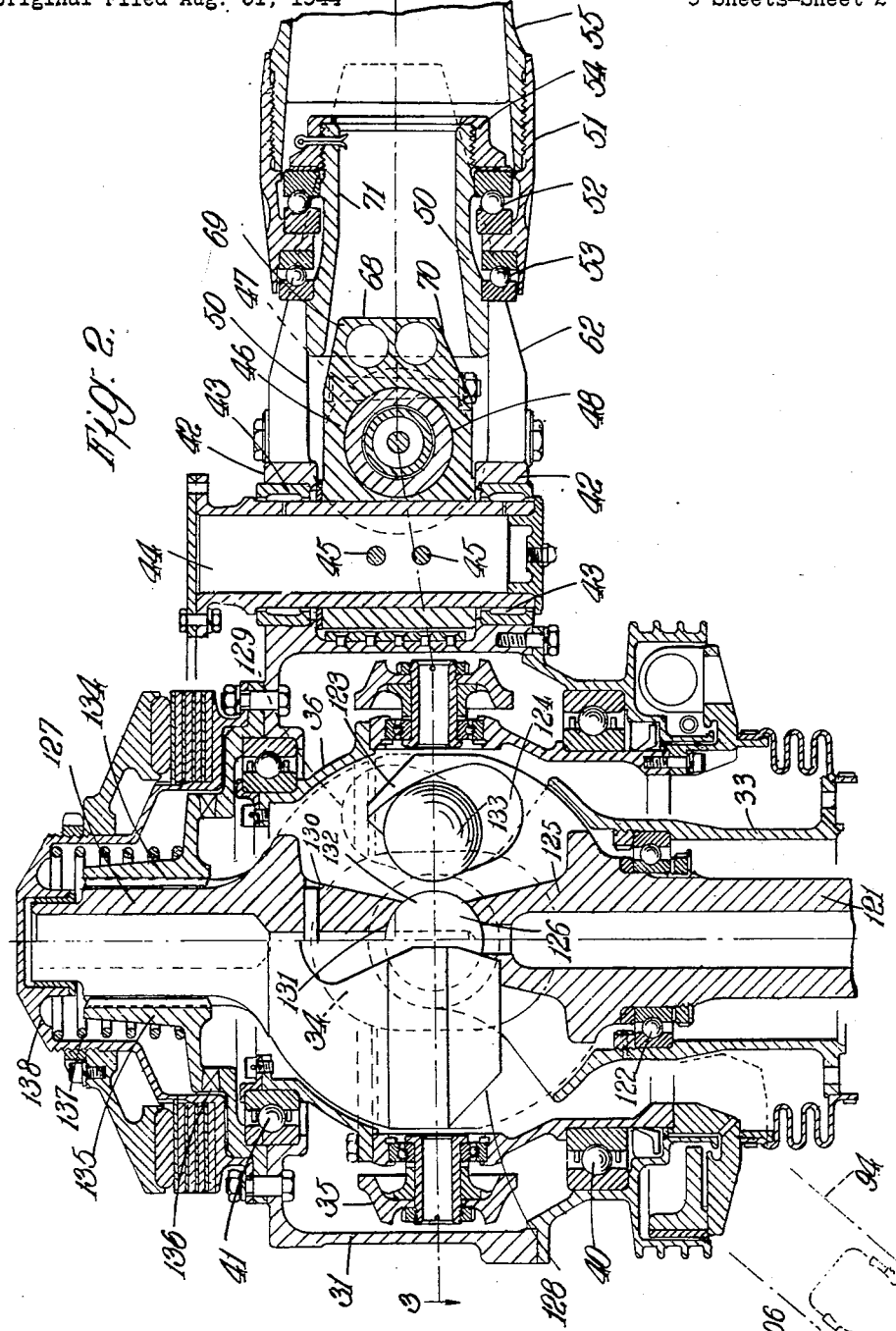

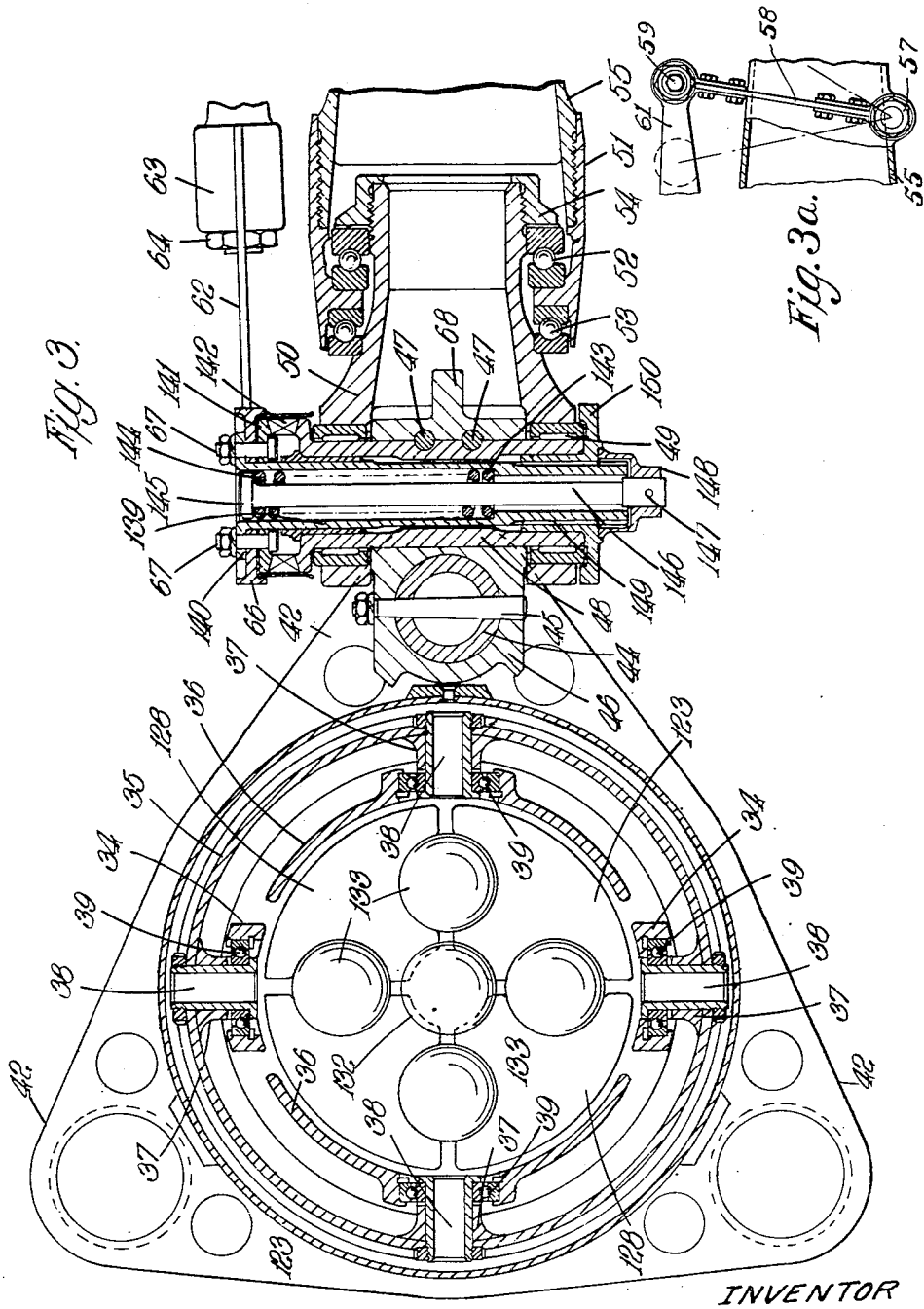

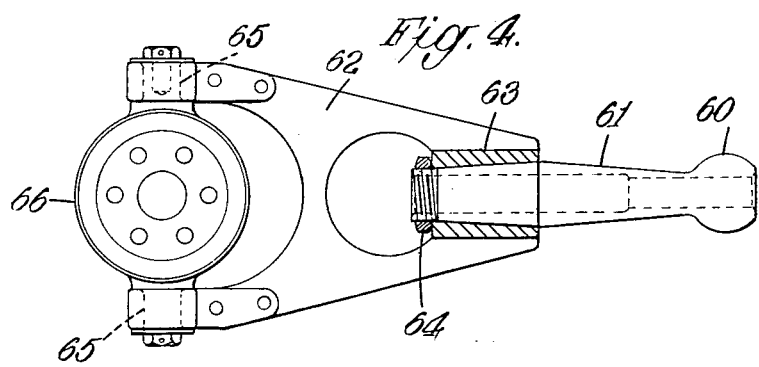
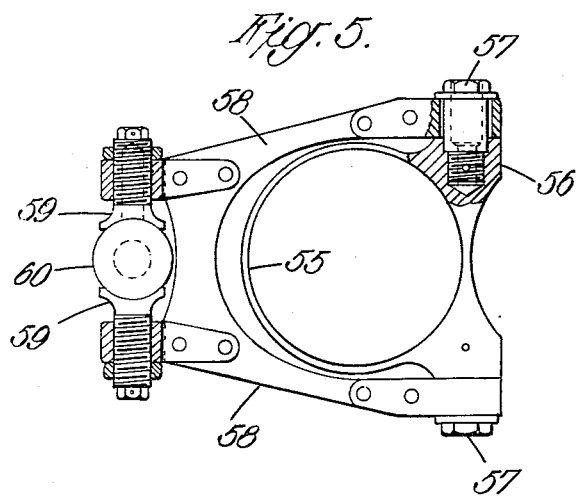

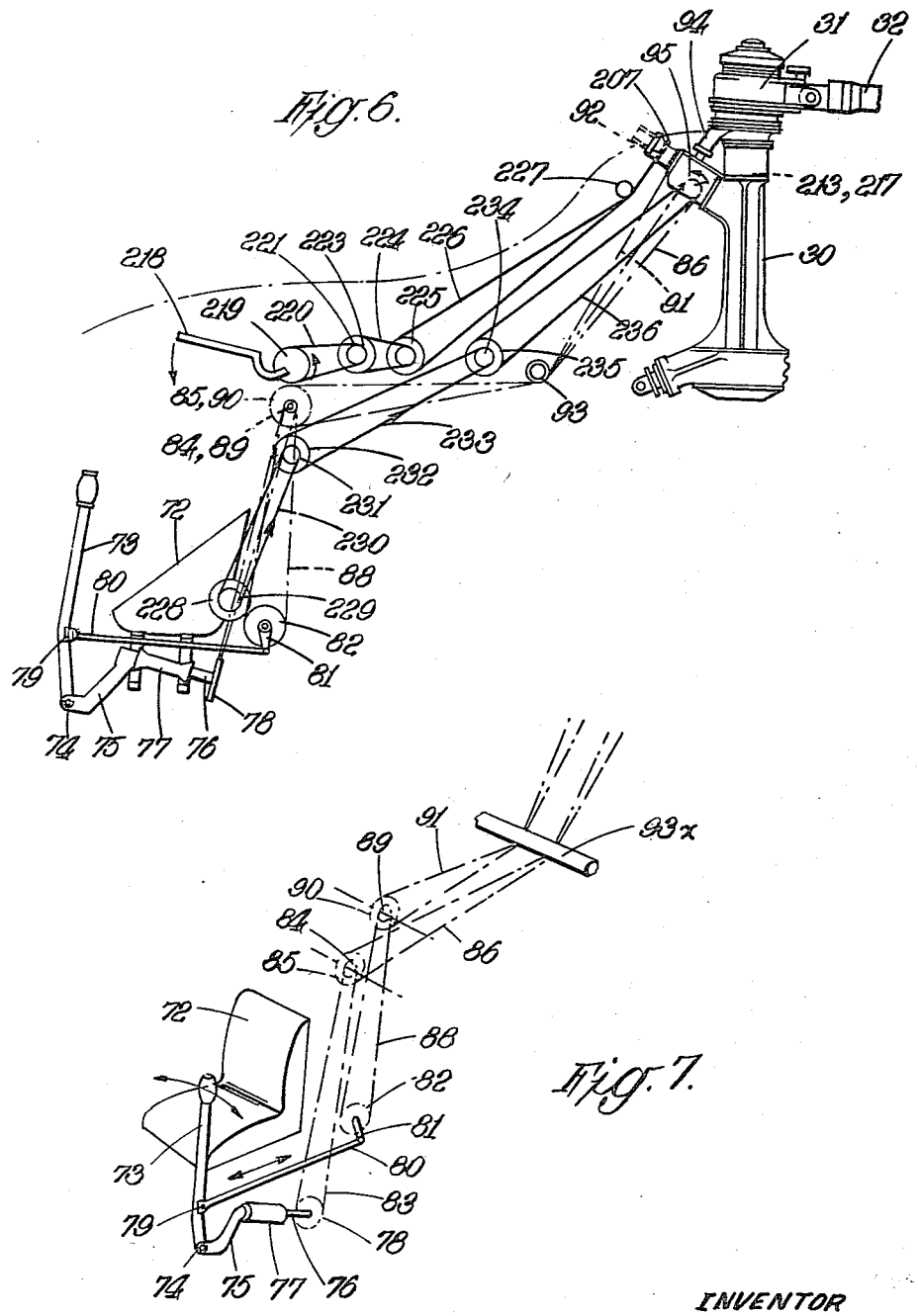

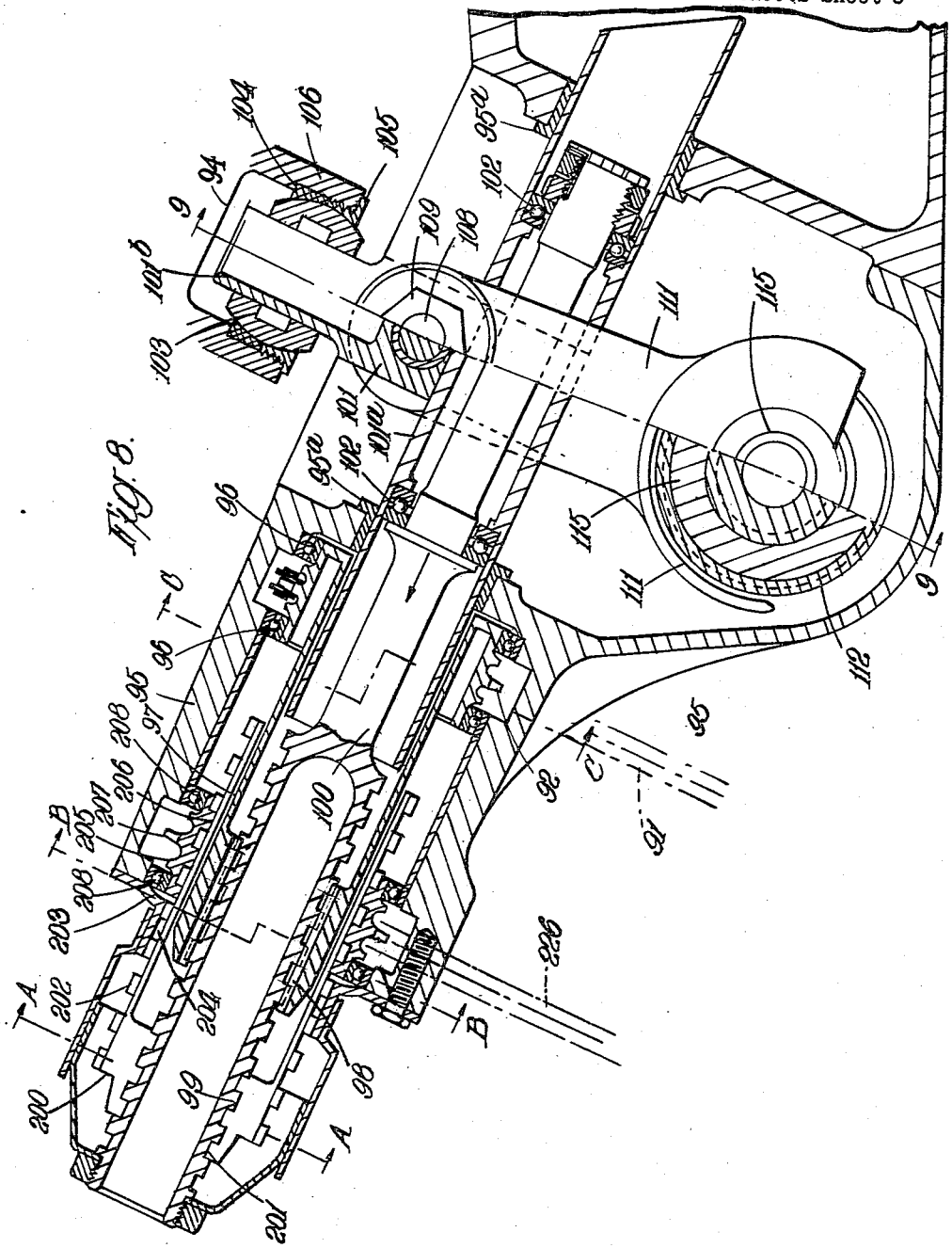

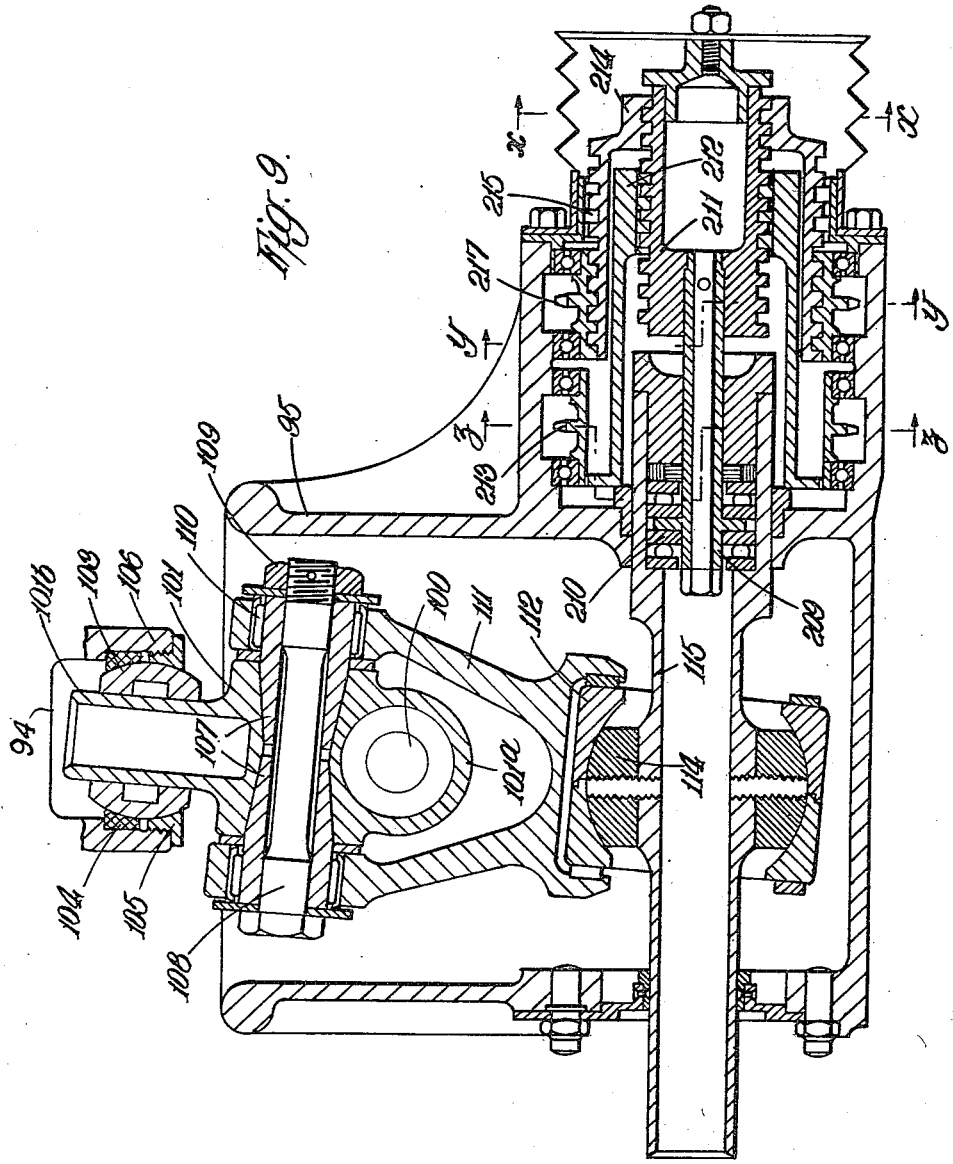

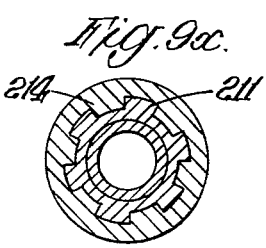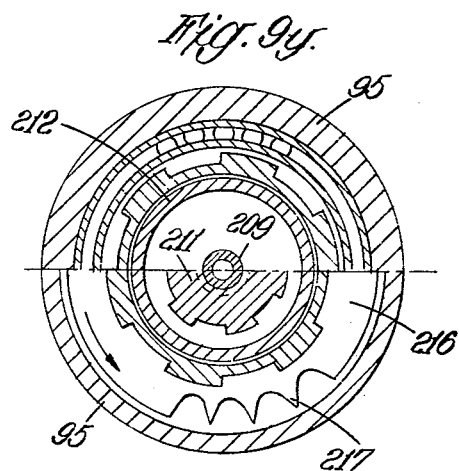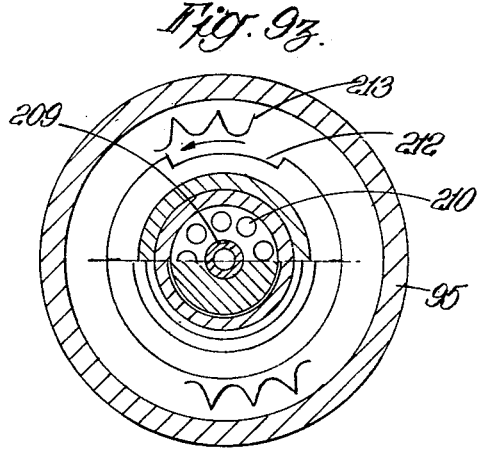

United States Patent Office 2,761,521
Patented Sept. 4, 1956

2,761,521

HELICOPTER ROTOR CONTROL MECHANISM

Cyril George Pullin, Moseley, Birmingham, England, assignor, by mesne assignments, to Autogiro Company of America, Philadelphia, Pa., a corporation of Delaware Continuation of application Serial No. 552,100, August 31, 1944. This application April 28, 1953, Serial No. 351,567

Claims priority, application Great Britain September 15, 1943

7 Claims. (Cl. 170—160.26)

The present invention relates to aircraft and especially to helicopters of the kind in which control in flight in pitch and roll is obtained by tilting the plane containing the path swept by the tips of the lifting rotor blades so as to cause appropriate inclinations in the pitching and rolling planes of the lift vector of the lifting rotor (or rotors) and wherein the same means is used to obtain an appropriate horizontal component from the lift vector for maintaining horizontal flight (or climbing or diving flight at any desired inclination of flight path).

Now the angular displacements of the plane containing the path swept by the blade tips (hereinafter referred to for brevity as the blade path) required for obtaining control in pitch and roll are of a small order relatively to the total range of angular displacement of the blade path required for obtaining the appropriate horizontal component of the lift vector in all conditions of flight between the extremes of vertical hovering flight on the one hand and level flight at maximum power or power dive conditions on the other hand. If, therefore, the gear ratio between displacements of the pilot's control column (or equivalent control device) and the resulting displacements of the blade path is such that the full range of displacement of the blade path required in passing from vertical or hovering flight to "all-out" level flight or power dive can be obtained within the available limits of displacement of the pilot's control column, the control displacements required for control purposes (correcting bumps, gusts, and performance of normal manoeuvres) will be very small and the control will therefore be unduly sensitive. Further, the neutral position of the control column in vertical or hovering flight will be almost fully back and in all-out level flight or power dive will be almost fully forward and this is obviously not conducive to comfort or ease of control for the pilot.

An object of the invention, therefore, is to overcome this disadvantage.

The invention broadly consists in the introduction of an additional control and appropriate mechanism actuated thereby for varying the "datum" setting of the pilot's control column (or equivalent control means), i. e. the positional relationship of the control column to the final member of the control transmission. The introduction of this additional control enables a lower gear ratio to be used between the displacements of the control column and the corresponding displacements of the final transmission member which controls the displacements of the blade path, thus producing a less sensitive and therefore more satisfactory control, transition from vertical or hovering flight to all-out level or power diving flight, or between intermediate flight regimes, e. g. climbing on an inclined path, horizontal cruising flight at reduced power, inclined power glide etc., being effected by manipulation of the additional "datum" control. This arrangement also enables the neutral position of the pilot's control column in any desired condition of flight to remain central in the cockpit.

It is immaterial for the purposes of the present invention whether the attitude of the blade path is controlled by a direct coupling between the pilot's control column and the axle member on which the rotor rotates, the said axle member being supported in a universal or gimbal mounting for this purpose, or whether the control is indirectly effected by coupling the control column to a tiltable swash plate or rotary spider member operating by means of suitable arms and linkages to produce cyclical variation of the pitch angles of the rotor blades, whose path is free to orientate itself relatively to the air-frame by the provision either of a universal or gimbal mounting of the rotor axis member or of flapping pivots or of both. The invention is concerned with the datum relationship between the pilot's control column and the final member of the control transmission which may be generically referred to as the blade path tilting member; in the first instance above mentioned the member in question is the rotor axle member and in the second instance it is the swash plate or spider member.

It is to be understood that the "variable datum" device of this invention is applicable to the tilting of the rotor blade tip path not only in the fore and aft plane, but also in the transverse plane, when a change is effected in the position of the lift vector in the fore and aft plane, a corresponding shift (of smaller extent of the lift vector) in the transverse plane also takes place and a corrective tilt of the blade tip path in a corrective sense has to be applied.

The variable datum device for the transverse tilting of the blade tip path may be entirely independent from that for the fore and aft tilting, having an independent control member or the two variable datum devices may be interconnected and operated by a single control to give an appropriate displacement of the transverse datum for any selected position of the fore and aft datum.

The constructional details required for carrying the invention into practice will depend on the type of coupling between the pilot's control column and the blade path tilting member. The nature of the invention will be more easily understood by consideration of selected simple examples. In one such example a control column of the hanging type is directly connected by means of a universal joint to a dependent arm secured to the blade path tilting member. In applying this invention to such an arrangement the fulcrum on which the control column is suspended is carried by a member which is slidably mounted to move in the fore-and-aft plane of the aircraft and its position is adjustable by means of a screw-jack which can be operated by means of a hand wheel in the cockpit; this hand wheel constitutes the fore-and-aft datum control.

In such an arrangement the normal flying control is "reversible" and manipulation of the datum control will tend to displace the control column rather than the blade path tilting member and therefore be ineffective unless an appropriate force is applied to the control column to hold it against movement. This disadvantage may be overcome according to a feature of the invention by spring-loading the control column so that when released it takes up a central position in the cockpit. As the spring tension required for holding the control column central and therefore for trimming the aircraft in a selected condition of flight will vary with the position of the datum control, means for adjusting the spring tension may be provided and are preferably coupled to the datum control in such a way that the correct spring tension is automatically selected for each position of the datum control, thus ensuring that the aircraft is automatically trimmed for every selected position of the datum control.

Alternatively, an irreversible type of control is employed, of which an example is hereinafter described with reference to the accompanying drawings. This type of control being irreversible, the provision of tensioning devices may be omitted, if desired, but appropriate adjustable spring-loading of the blade path tilting member may be provided in order to relieve the loading of the control connections. As in the previous example, the means for adjusting the tension of the loading springs may be suitably coupled to the datum control.

The nature of this invention and how it may be constructionally realised, will be more fully understood from the following description with reference to the accompanying drawings of a preferred embodiment thereof.

In the drawings:

Figure 1 is a somewhat diagrammatic view in side elevation, partly in section, of a helicopter embodying the invention;

Figure 2 is a view in longitudinal vertical section of the rotor hub and attachments of one rotor blade;

Figure 8A:
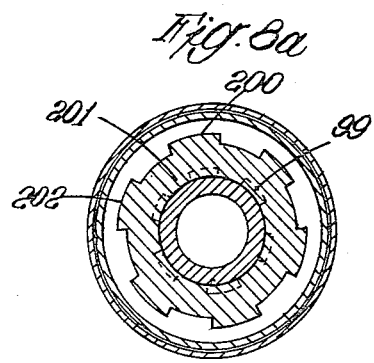
Figure 8B:
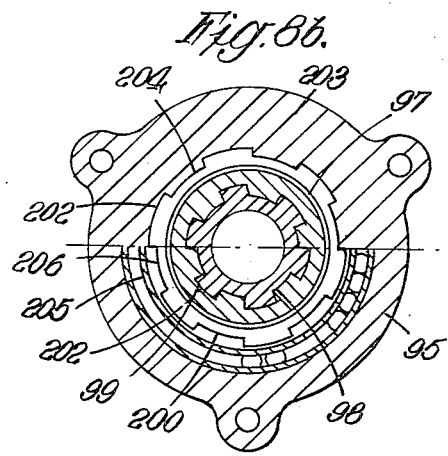
Figure 8C:
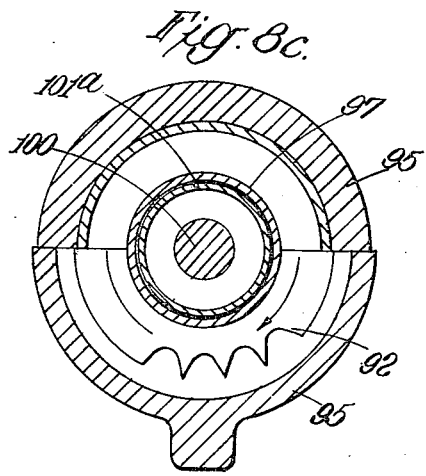

Figures 3 and 3a taken together comprise a view in section taken along the line 3—3 of Figure 2;

Figures 4 and 5 are detail views in elevation of parts shown in Figures 3 and 3a;

Figure 6 is a somewhat diagrammatic view in side elevation of the pilot's control connections;

Figure 7 is a diagrammatic view of the same in perspective;

Figure 8 is a view in longitudinal vertical section of the "control housing" (shown at 95 in Figure 6);

Figure 8A is a view in section taken on the line A—A of Figure 8;

Figure 8B is a view in section taken on the line B—B of Figure 8;

Figure 8C is a view in section taken on the line C—C of Figure 8;

Figure 9 is a view in section taken along the line 9—9 of Figure 8;

Figure 9X is a view in section taken along the line X—X of Figure 9;

Figure 9Y is a view in section taken along the line Y—Y of Figure 9; and

Figure 9Z is a view in section taken along the line Z—Z of Figure 9.

Referring to Figure 1, the helicopter includes a body 21, undercarriage elements 22, elevator 23, vertical fin 24 and rudder 25. Within the body is mounted the engine 26, which drives the rotor through gears contained in gear boxes 27, 29 and a transmission shaft 28. The final drive shaft is contained in a casing 30 forming an extension of the gear box 29.

The rotor hub is shown at 31 and the lifting rotor blades at 32.

Referring now to Figures 2, 3, 4 and 5, the casing 30 of Figure 1 is extended upwardly by a hollow support member 33 terminating in a forked end 34 which supports a gimbal ring 35; this in turn supports a hollow axle member 36. The gimbal ring 35 is provided with four equally spaced inwardly projecting bosses 37 carrying trunnions 38 provided with ball bearings 39. One pair of trunnions articulates with the ends of the supporting fork 34 and the other pair of trunnions with the axle member 36, on which the hub 31 is rotatably mounted by means of ball bearings 40, 41.

The rotor in this example has three blades, to support which the hub is provided with three pairs of ears 42 housing needle bearings 43, in which drag pivot pins 44 are rotatable. Drag links 46 are secured by taper pins 45 to the pins 44. Lead/lag displacements of the rotor blades are accommodated by movement of the drag links and pivot pins relatively to the hub ears 42.

Secured by taper pins 47 in the drag link 46 is a flapping pivot pin 48 and rotatably mounted thereon by means of needle bearings 49 is a blade root supporting link 50 on which the blade is rotatably mounted for torsional, i. e. pitch varying, displacement by means of a ball thrust bearing 52, a preload bearing 53 and a preload nut 54. The main spar of the blade (32) is shown at 55 and is screwed into a blade root housing 51 which is supported on the bearings 52, 53.

The torsional and flapping displacements of the blade are made interdependent by means of a linkage comprising a lever 58 secured to the blade and an arm 61, 62 lying approximately parallel to the blade and on the leading side thereof, and secured to the flapping pivot pin. This construction is shown in Figures 3, 4 and 5.

A pair of lugs 56 integral with the spar 55 carries pivot studs 57 on which the lever 58, which is forked, articulates. The forward end of this lever carries studs 59 with spherical seatings which engage a ball 60 formed on the end of the arm part 61; the other end of the latter is tapered to fit in a taper socket of a boss 63 formed on the arm part 62, being secured by a nut 64. The inboard end of the arm part 62 is forked and the fork end engages trunnions 65 formed on a collar 66, which is secured by bolts 67 to a flange integral with the flapping pivot pin 48.

Since the pin 48 is locked to the drag link, the arm 61, 62 is prevented from flapping with the blade, with the result that when the blade flaps upwards, the linkage 58, 61, 62 causes the blade spar 55 to rotate about the blade-supporting link 50 (on the bearings 52, 53) in the direction for decreasing the pitch angle of the blade. Conversely, downward flapping is accompanied by increase of pitch angle.

Limitation of upward and downward flapping is provided by means of a stop plate 68, formed integrally with the drag link 46 and having upper and lower faces 69, 70 which engage the inner surface 71 of the blade-supporting link 50.

In the type of rotor herein illustrated and described the inclination of the path swept by the rotor blade tips with respect to the body of the helicopter, in both the fore and aft and transverse planes, and hence the position of the lift vector (in both said planes), is governed by tilting the rotor axle member 36 (and with it the hub member 31) on the gimbal mounting described above. For this purpose the hub member 36 is provided with an integrally formed actuating arm 94 (see Figure 2) through which the tilting of the hub relatively to the body is effected by means of the mechanism hereinafter described with reference to Figures 6, 7, 8, 8A, 8B, 8C, 9, 9X, 9Y, 9Z.

Referring now to Figures 6 and 7, the pilot's seat is indicated at 72. In the conventional position is a control column 73 pivoted at 74 to a crank 75 integral with a rocking shaft 76 supported in a bearing 77 and carrying a sprocket 78. The control column is also pivoted at 79 to a push-pull rod 80 actuating a crank 81 carrying a sprocket 82.

A chain or cable 83 is passed over the sprocket 78 and over another sprocket 84 which is fast on a further sprocket 85.

Similarly a chain or cable 88 connects the sprocket 82 with a sprocket 89 fast on yet another sprocket 90. Sprockets 84, 85, 89, 90 are coaxial as shown in Figure 6, but for convenience in following the run of the controls the pairs of sprockets 84, 85 and 89, 90 respectively are shown in Figure 7 with their axes separated.

Sprockets 85 carries a chain or cable 86 which is also passed over a sprocket 213, within a control housing 95, while another sprocket 92 within this housing (see Figure 8) is actuted by a chain or cable 91 which is passed over sprocket 90.

The chains or cables 86, 91 are also passed over four jockey pulleys 93 (indicated diagrammatically in Figure 7 by a bar 93x).

The above described elements constitute the control members and transmission connections for the fore and aft and transverse control of the rotor, as distinct from the variable datum mechanism which comprises:

(a) For fore and aft datum variation, a hand lever 218 carrying a sprocket 219, which actuates a train of chains and sprockets, 220, 221, 223, 224, 225, 226, the last named of which is passed over jockey sprockets 227 and actuates a sprocket 207 mounted in the control housing 95. The lever 218 may be provided with a ratchet quadrant (not illustrated) to enable it to be positively located in any required position.

(b) For transverse datum variation, a hand wheel 228 which operates a train of sprockets and chains 229, 230, 231, 232, 233, 234, 235 and 236, the last named of which actuates a sprocket 217 mounted in the control housing 95.

Referring to Figures 8 and 9, the actuating arm 94 (of the axle member 36) terminates in a socket 106 (see Figure 2) in which are arranged a spherical seating 104 and spherical-seated retaining nut 105, which embrace a ball 103 mounted on a spigot 101b forming part of an intermediate member which consists of a central boss 101, the upwardly projecting spigot 101b already mentioned, and a sleeve 101a which is axially slidable and rotatable in bearings 95a carried by the control housing 95. The axis of the sleeve part 101a being in the fore and aft plane, tilting of the axle member 36 is effected by sliding the member 101, 101a, 101b, axially in its bearings and transverse tilting by rocking the member 101, 101a, 101b, about the axis of sleeve 101a: the motion is transmitted to the axle 36 by the articulation of the spigot 101b with the actuating arm 94, 106 at the ball and socket joint 103, 104, 105.

Referring more particularly to Figures 8, 8A, 8B, 8C, fore and aft motion is applied to the sleeve 101a by means of a rod 100 through thrust bearings 102. The rod 100 has an extension on which is formed a thread 99 interrupted by longitudinal grooves. The thread 99 engages a corresponding female thread 201 formed in a sleeve 200 and the grooves engage splines 98 formed in a sleeve 97 rotatably supported by bearings 96 and carrying the sprocket 92 hereinbefore mentioned. The sleeve 200 has formed thereon a male thread 202 engaging a corresponding female thread 206 formed in a boss 205, rotatably supported in bearings 208, and having the sprocket 207 (hereinbefore mentioned) integrally formed thereon. The thread 202 is interrupted by longitudinal grooves which engage splines 204 formed in a cap member 203 secured to the housing 95 and the latter engagement prevents sleeve 200 from rotating.

As already explained the "datum" control 218 actuates the sprocket 207, rotation of which causes the sleeve 200 to move axially on account of the threaded engagement of the parts 202, 206, which form a screw-jack; axial movement of sleeve 200 is transmitted to the extension of rod 100, by the engagement of threads 99, 201 whose pitch is such that there is no tendency to rotate the rod 100, i. e. the transmission is irreversible. The thread of parts 202, 206 is of relatively coarse pitch as the datum control is required to effect major displacements of the rod 100 in the axial direction in order to bring about large variations in the fore and aft tilt of the rotor axle and hub.

As already stated the ordinary control column actuates the sprocket 92 which rotates the sleeve 97, whose splines 98 transmit the rotation to the extension of the rod 100; the sleeve 200 being prevented from rotating, as explained above, the threaded engagement of parts 99, 201, causes the rod 100 to be moved longitudinally. The threads 99, 201 are of relatively fine pitch, because the tilting displacements of the axle and hub required for control purposes and consequent displacements of the rod 100 are of a relatively small order.

Referring to Figures 9, 9X 9Y, 9Z, rocking of the member 101 etc. about the axis of sleeve 101a, for transverse tilting of the rotor axle and hub, is effected by a forked member 111, which articulates by means of needle bearings 110 on a split taper pivot 107 secured in the member 101 by means of a through bolt 108 and nut 109. The lower end of the fork member 111 carries a split spherical socket 112 articulting with a ball 114 mounted on a rod 115, axial movement of which rocks the fork member 111 and the intermediate member 101, 101a, 101b, whereby the actuating arm 94 is moved to tilt the axle and hub transversely.

Axial movement is transmitted to rod 115 through a double thrust bearing 210 by a spindle 209, which is pinned into an extension 211.

The mechanism whereby "variable datum" and normal control displacements are applied to the extension 211 are similar to those already described for the fore and aft movements and are therefore described somewhat more briefly.

Extension 211 has interrupted male threads engaging female threads on a sleeve 214 and splines on a sleeve 212. The latter is rotatable and carries the "control" sprocket 213, whereas sleeve 214 has interrupted male threads engaging female threads on a sleeve integral with the "datum" sprocket 217, the interruption of the male threads engaging splines 216 formed on a cap member secured to the housing 95: the sleeve 214 is thus prevented from rotating.

Rotation of the "datum" sprocket 217 therefore causes the sleeve 214 to move axially carrying with it the extension 211, spindle 209 and rod 115. Similarly, rotation of the "control" sprocket 213 is transmitted by sleeve 212 and its splined engagement with extension 211 to the latter member whose threaded engagement with sleeve 214, which cannot rotate, causes the required axial displacement of extension 211, spindle 209 and rod 115.

As in the mechanism for fore and aft displacements, the pitches of the corresponding threads of members 217, 214 and 214; 211 respectively are proportioned to give relatively large displacement (of the axle and hub) for a given displacement of the "datum" sprocket and relatively small displacement (of axle and hub) for a given displacement of the "control" sprocket. It will be seen that the mechanism above described ensures that manipulation of the "variable datum" control members 218 or 228 (see Figure 6) brings about the required tilting of the rotor axle and hub without effecting any change of position of the control column 73 and that movements of the latter either fore and aft or transversely have no effect on the "variable datum" controls and cause uniform tilting displacements of the axle and hub, whatever are the selected positions of the "variable datum" controls; in other words the gear ratios of normal fore and aft and transverse controls are unaffected by the "variable datum" settings. Further it will be seen that both "variable datum" and "normal" controls are irreversible in their action, so that control column loads are unaffected by changes of "variable datum" settings, and manipulation of the control column will not tend to shift the "variable datum" settings.

This application is a continuation of application 552,100, filed August 31, 1944, now abandoned.

I claim:

1. A control mechanism for aircraft, incorporating a control member connected for differential actuation by two independent controls, said mechanism also comprising a compound screw-jack device having an axially slidable but non-rotatable member with two coaxial threads of differing pitch formed thereon, a rotatable member actuated by one of the controls and threaded to engage one of said threads, an axially slidable and rotatable member threaded to engage the other of said threads and a second rotatable member actuated by the other of said controls and having slidable but non-rotatable connection with the axially slidable and rotatable member, which latter is connected to the member to be finally actuated.

2. In an aircraft having a bladed rotor, controllable means for tilting the rotor blade tip path relative to the body of the aircraft, and a pilot's control element: mechanism connecting the element and the controllable means incorporating a compound screw-jack device including two independent screw-jacks arranged to operate in parallel, transmission means for actuating one of said screw-jacks from said pilot's control element, and supplemental transmission means having a control member independent of the pilot's control element for actuating the other screw-jack.

3. In a helicopter having a bladed rotor, controllable means for effecting tilting of the rotor blade tip path relative to the body of the aircraft, a normal-control-member, and control linkage interconnecting the controllable means and the member for effecting tilting of the rotor blade tip path to positions of equilibrium related to the corresponding positions of the normal-control-member: means operative upon the linkage for varying the equilibrium condition tip path position relative to the normal-control-member-position, an independent datum-control-member coupled to said relation varying means, and means resisting changes in position of said normal-control-member responsive to operation of said datum-control-member.

4. In a helicopter having a bladed rotor, controllable means for effecting tilting of the rotor blade tip path relative to the body of the aircraft, a pilot's control element and control mechanism interconnecting the controllable means and the pilot's control element for tilting the said path through a relatively small angle; an additional pilot's control member and additional mechanism interconnecting said additional control member and said controllable means for tilting the blade tip path through a relatively large angle independently of the operation of the first-mentioned control and without affecting the operation of the first-mentioned control element, said two mechanisms comprising a compound screw-jack device, including two independent screw jacks of differing gear ratio and arranged to operate in parallel, transmission means for actuating one of said screw jacks from the pilot's control element, and supplemental transmission means for actuating the other screw jack from the additional pilot's control member.

5. In an aircraft having rotor means incorporating rotor blades and mechanism operative upon the rotor blades for controllably shifting the rotor thrust line including a shiftably movable control element for controllably shifting the rotor thrust line through a range in a given sense, a pilot's control organ shiftable through a range including a neutral positon to shift said thrust line in said sense, a second pilot-operable control organ, operable independently of the first control organ to shift said thrust line in said sense, motion-combining means having a pair of control movement receiving parts respectively connected with said two control organs, and the motion-combining means further having a single control movement delivery part connected with said control element.

6. Mechanism according to claim 5, wherein the motion combining means incorporates mechanical advantage means constructed to shift the rotor thrust line through a relatively small angle upon movement of the first pilot's control organ, and through a relatively large angle upon movement of the second pilot's operable control organ.

7. Mechanism according to claim 5, wherein the connections between said control organs and said motion combining means transmit movement irreversibly.

References Cited in the file of this patent

UNITED STATES PATENTS

| | | |
|---|---|---|
| 2,224,357 | Pecker | Dec. 10, 1940 |
| 2,256,918 | Young | Sept. 23, 1941 |
| 2,273,051 | Larsen | Feb. 17, 1942 |
| 2,330,842 | Pullin | Oct. 5, 1943 |
| 2,402,349 | Sikorsky | June 18, 1946 |
| 2,405,188 | Campbell | Aug. 6, 1946 |